Oct. 23, 1956  R. J. MEIER  2,767,458
SAW TABLE
Filed March 19, 1954  4 Sheets-Sheet 1
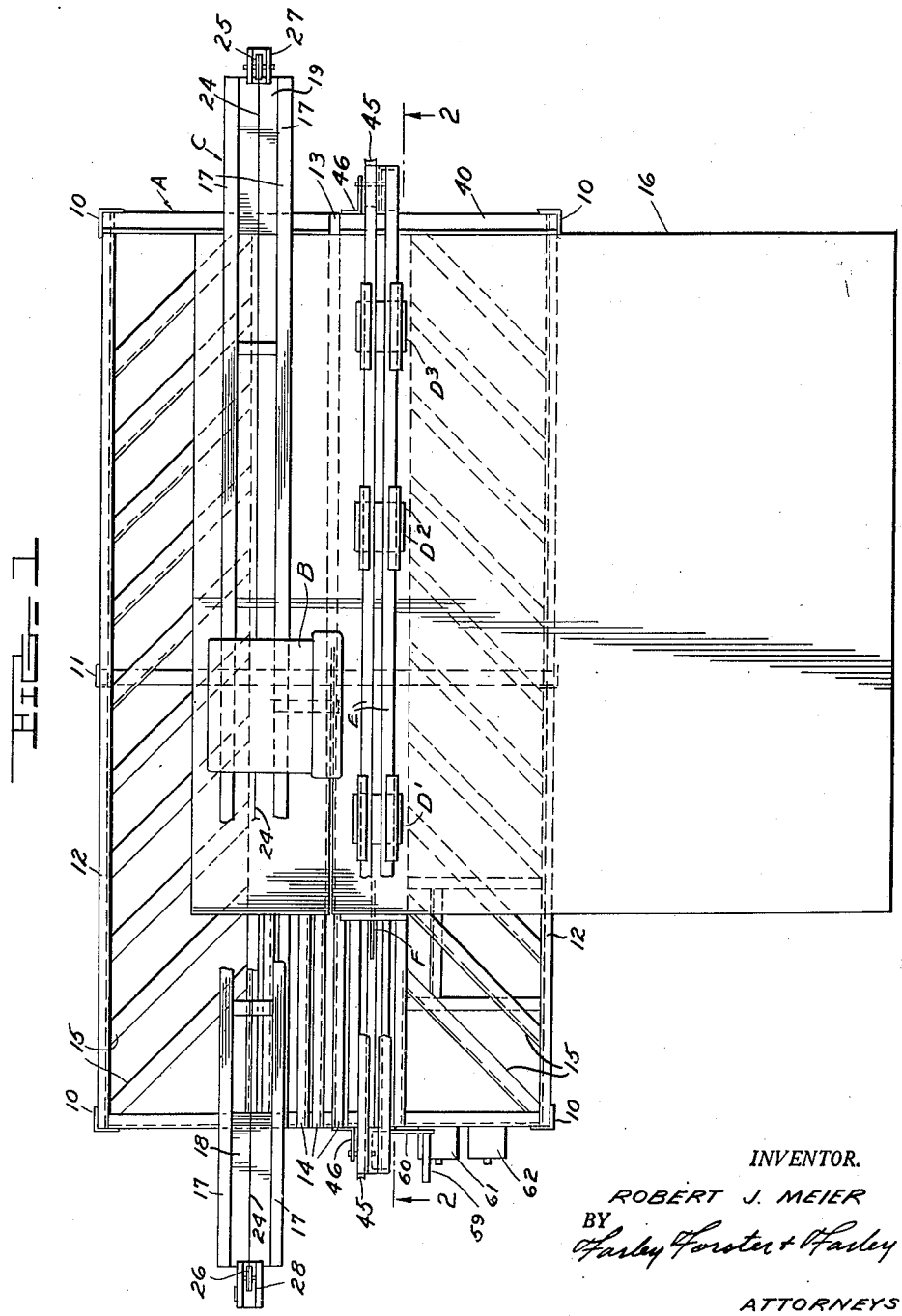
INVENTOR.
ROBERT J. MEIER
BY
Farley Forster & Farley
ATTORNEYS

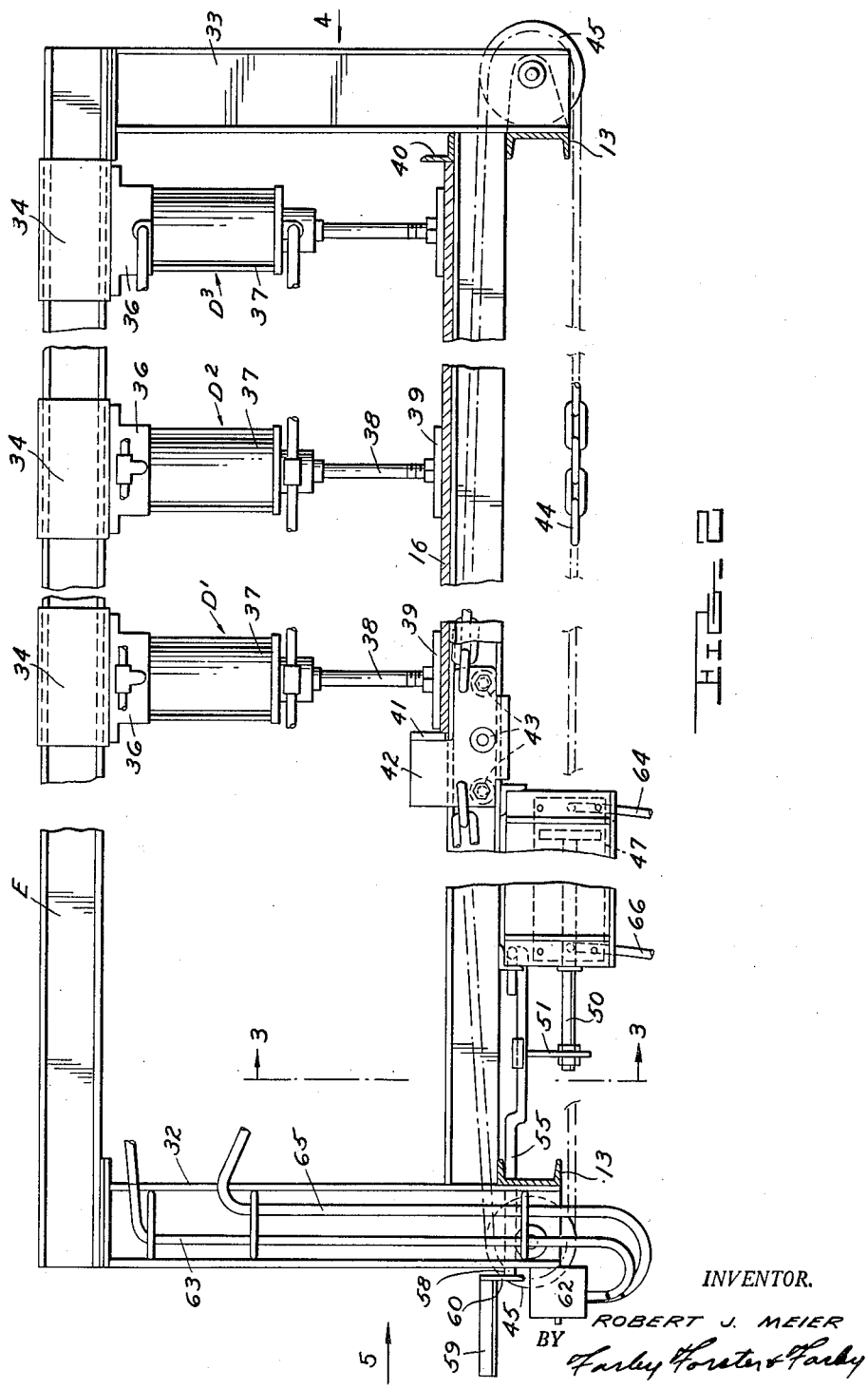

Oct. 23, 1956  R. J. MEIER  2,767,458
SAW TABLE
Filed March 19, 1954  4 Sheets-Sheet 3
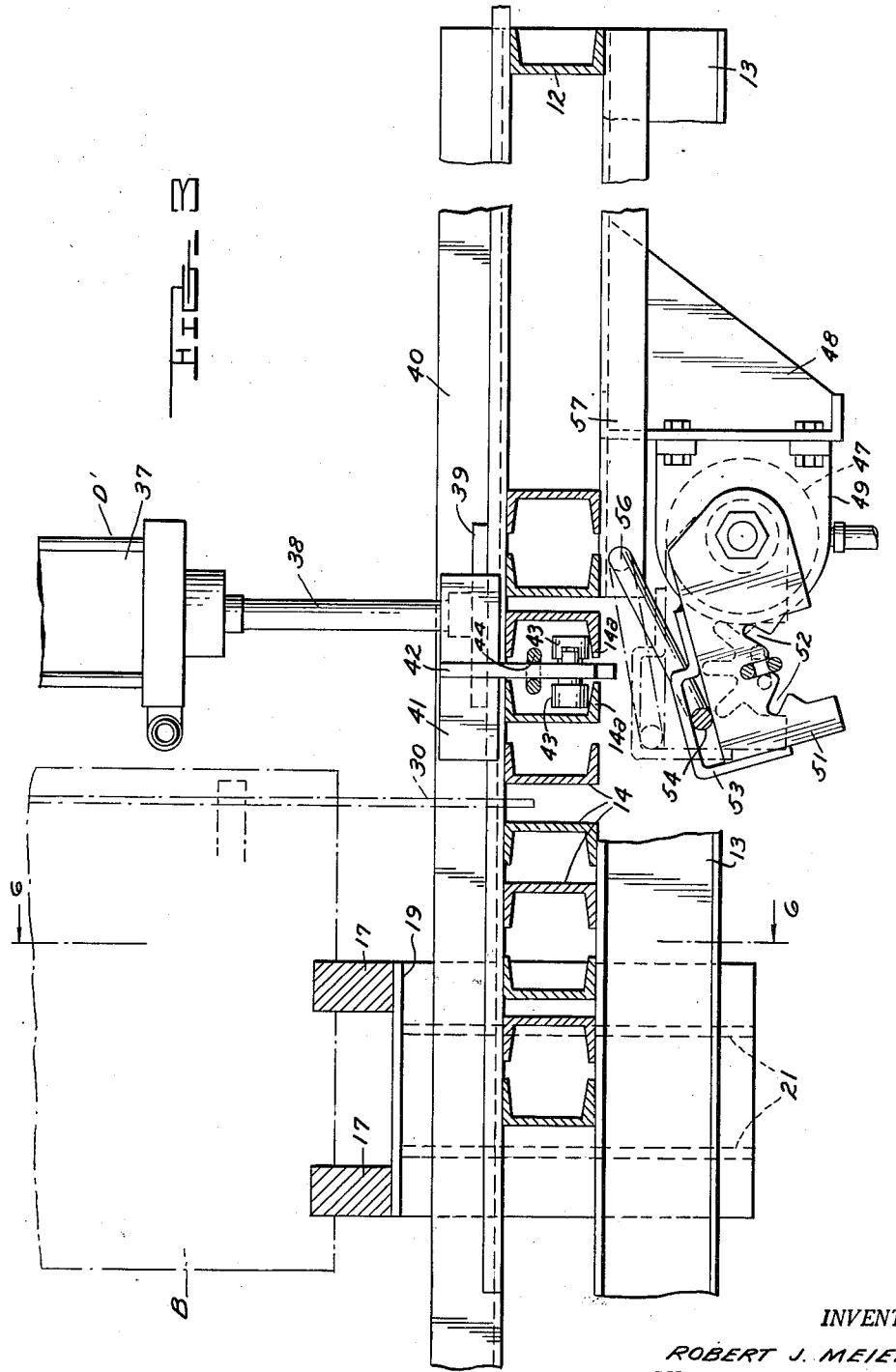
INVENTOR.
ROBERT J. MEIER
BY
Farley Forster & Farley
ATTORNEYS

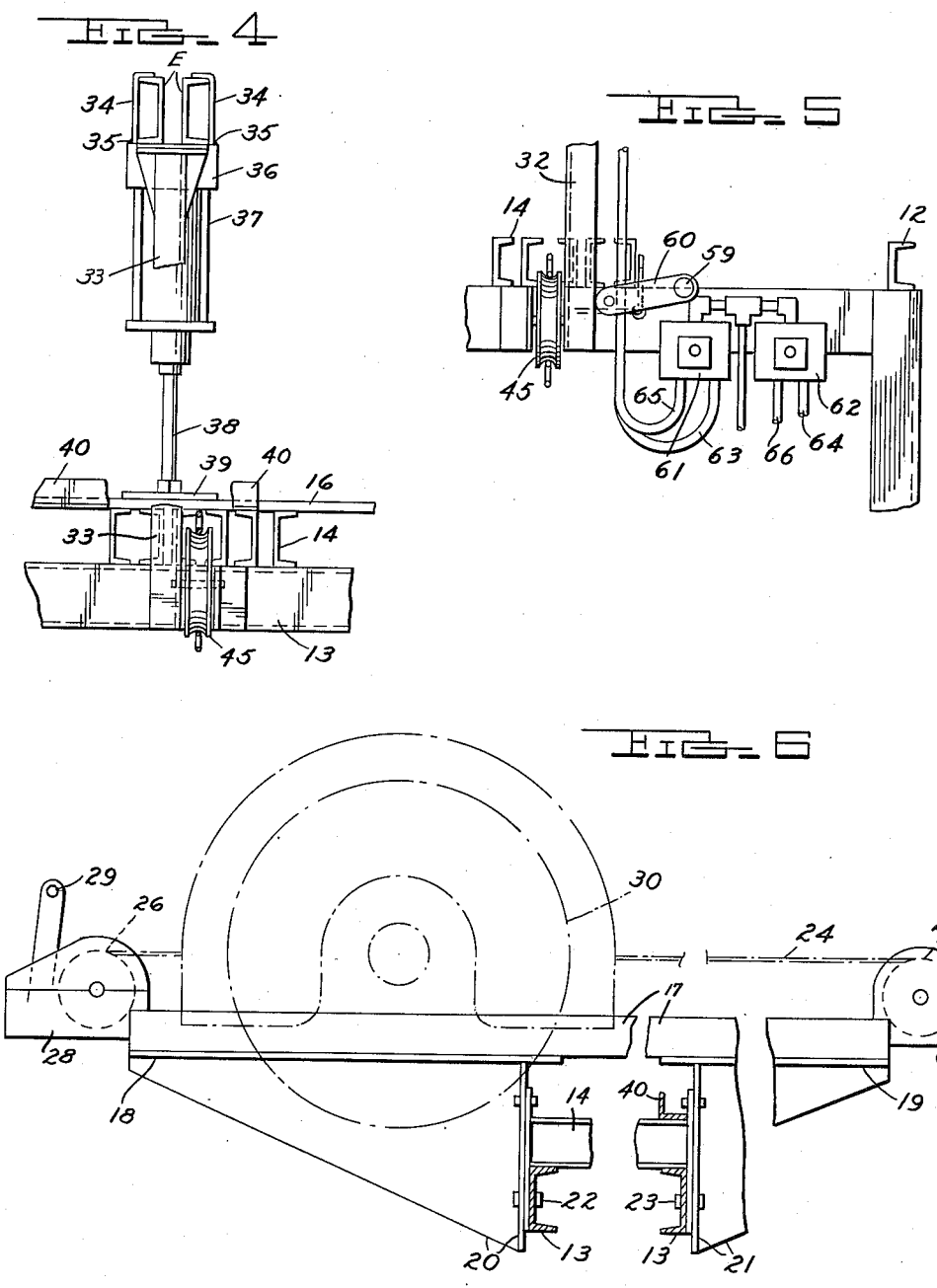

United States Patent Office 2,767,458
Patented Oct. 23, 1956

2,767,458
SAW TABLE
Robert J. Meier, Grosse Pointe, Mich.
Application March 19, 1954, Serial No. 417,330
1 Claim. (Cl. 29—67)

This invention relates to a saw table for cutting heavy metal plates, metal sheets, bar stock and the like, and more particularly to a saw table adapted for use with a traveling circular saw.

In steel, brass, aluminum and other metal cutting operations, the saw cutting of heavy plates, bar stock and sheet materials to special sizes is a continual requirement demanding efficient cutting equipment and methods. Band saw cuts are, in many instances, unsatisfactory and limited by numerous factors. The speed of cut is relatively slow; the width of cut material is limited by the yoke of the saw; movement of heavy and unwieldy pieces across a stationary table surface in an accurate path is a difficult operation; and where a movable table bed is employed with conventional C clamping means to hold the stock material to be cut in position, the clamping is both time consuming and inefficient particularly where any substantial overhang of material is involved. In addition, band saw cuts are generally wavy and relatively rough, leaving the requirement for a substantial machining operation to clean up and true the cut edge surfaces.

The development of a traveling motor driven circular saw has overcome some of the deficiencies and limitations of the band saw cutting. In a conventional installation, a pair of overhanging rails are mounted above the surface of a simple table top and, with the saw retracted to a clearance position, plate or sheet material is positioned on the table surface under the rails of the saw, and clamped at accessible points along marginal edges, whereupon the motorized saw is propelled by a chain drive to cut the material in desired widths. However, the use of traveling saw installations in metal plate and sheet sawing operations has been retarded by the lack of adequate clamping means for holding plates or sheet material in position on the table top. The conventional hand C clamping means limited to the marginal edges of the large piece to be cut has been found in practice to be time consuming to set up and inadequate, particularly where any substantial over-hang of the material to be cut is involved. Furthermore, the lack of any effective clamping pressure along the line of cut permits vibration to set up reducing the accuracy, smoothness, and speed of cut inherently possible with a high speed circular saw.

In order to overcome these latter limitations, and more fully realize the full potential of the traveling saw in providing a fast, smooth, accurate cut, the present saw table has been developed to provide power actuated clamping at intervals along the top of the material adjacent the line of cut as well as power actuated means for squaring heavy plate materials by edge engagement prior to power clamping the top surface of the same, or for holding bar stock by side engagement. Through the use of such clamping means at intermediate points along the length of cut, it has been found possible to obtain extremely accurate, smoothly finished cuts at speeds previously thought to be impossible, and the set-up time in squaring and clamping plate and sheet materials has been reduced to a point which increases the saw table capacity many times over conventional prior cutting practices.

Accordingly, the principal object of the present invention is to provide a saw table adapted for use with a traveling circular saw incorporating power actuating clamping means at intervals along the entire length of the cut.

Another object is to render said clamping means automatically effective for any depth of plate or sheet material.

Another object is to provide power clamping means for squaring plate material in proper position for cutting and for side clamping of bar stock.

Another object is to adapt such latter clamping means to any length of material without resort to a long actuating power stroke.

Another object is to provide a saw table with relatively narrow width occupying a minimum of space which is nevertheless capable of securely clamping large plates in cutting positions where the plates substantially over-hang the side of the table.

These and other objects will be apparent from the following description of a preferred embodiment of my invention and from an examination of the drawings disclosing such embodiment wherein Fig. 1 is a plan view of the present saw table with an over-hanging plate clamped in position for a typical saw cut.

Fig. 2 is a sectional side elevation taken along the line 2—2 of Fig. 1.

Fig. 3 is a sectional end elevation taken along the line 3—3 of Fig. 2.

Fig. 4 is a fragmentary end elevation taken along the line 4—4 of Fig. 2.

Fig. 5 is a fragmentary end elevation taken along the line 5—5 of Fig. 2.

Fig. 6 is a fragmentary side elevation showing the traveling saw assembly taken along the line 6—6 of Fig. 3.

Referring to Fig. 1, it will be seen that the preferred embodiment of the present invention employs a relatively narrow table A of sufficient length to accommodate the longest material size to be handled, a traveling motorized saw B adapted to move longitudinally on a rail structure C mounted above and over-hanging either end of the table A, a plurality of pressure cylinders D1, D2, and D3 respectively mounted on a beam structure E extending longitudinally above the table A and parallel to the traveling saw rail structure C, together with a pressure cylinder actuated edge squaring device F.

The table proper is constructed with four corner legs, 10, and two center legs, 11, welded to longitudinal channel members 12, and transverse channel members 13, forming a main rectangular frame-work. A plurality of additional channel members 14, mounted on the transverse channel members 13, extend longitudinally throughout the central portion of the table and a series of oblique channel members 15, are welded at their ends to the inner edges of the channel members 12, and outermost channel members 14. The uppermost flanges of the longitudinal channel members 12 and 14, and the oblique channel members 15 define a non-continuous upper surface for the table on which a large metal plate such as 16 may be clamped.

As best shown in Figures 3 and 6, rails 17 for the traveling saw B are mounted on horizontal end plates 18 and 19, welded to vertical plates 20 and 21 respectively which are bolted as at 22 and 23 to the transverse channel members 13, at the respective ends of the table. The traveling saw B, the detailed construction of which forms no part of the present invention, is adapted to be moved along the rails 17 by an endless chain 24 passing over sprockets 25 and 26 rotatively journaled in U hangers 27 and 28, the sprocket 26 being actuated by a crank arm 29 through suitable gearing not shown. The lower edge of the rotary saw blade 30 is adapted to extend between adjacent longitudinal channel members 14, a suitable distance below the table as best shown in Fig. 3. As previously mentioned, the hold down cylinders D1, D2, and D3, are mounted on a pair of channel beams E which, as best shown in Fig. 2, are mounted on vertical columns 32, 33 respectively welded at either end of the table to the transverse channel member 13. Each of the hold down cylinders D is adjustably suspended from the beams E by a pair of angles 34, welded at 35 to transverse brackets 36 which hold a pressure cylinder 37 and are adapted to reactively engage the lower surfaces of the channel beams E when the pressure cylinder is actuated. A piston rod 38 extending down from each of the cylinders 37 is adapted with a circular pressure plate 39 to engage the metal plate 16 at a series of positions closely adjacent to the line of cut and securely clamp such material against the upper surface of a plurality of the longitudinal channel members 14 forming the central upper surface of the table as best shown in Fig. 3.

Referring to Fig. 2, a squaring angle 40 extends across one end of the table surface normal to the line of cut and is welded securely to the ends of the channel members. The clamping device F for moving a plate 16 into engagement with squaring angle 40 consists of a transverse pressure plate 41 welded to a vertical member 42, which extends between a pair of opposed longitudinal channel members 14a and is provided with a plurality of rollers 43 adapted to run along the lower flanges of such channel members. The ends of a link chain 44 are connected to either end of the member 42, such chain passing over sheaves 45 mounted on angle brackets 46 at either end of the table. A fluid pressure actuated cylinder 47 is mounted below the table surface by suitable brackets 48 and 49 and is provided with a piston rod 50 at the end of which is welded an adaptor plate 51 having several slots 52 extending at different angles, one of which is adapted to engage a link of the chain 44 when the adaptor plate is in its lowered position, as shown in full line in Fig. 3, regardless of the angular position of the chain links at the engaging position. A guide strap 53 welded to the adaptor plate 51 engages a longitudinally extending offset portion 54 of a crank member 55 pivotally connected at 56 to angle member 57 and having an extension 58 passing through the channel member 13 connected to an actuating crank handle 59 through attaching link 60. Through the handle 59, the adaptor plate 51 may be actuated to a chain engaging position or raised to a disengaging position as shown in phantom in Fig. 3.

With the adaptor plate so raised, the operator may manually adjust the member 42 to a position approaching engagement with the edge of plate 16 by moving the lower reach of the chain 44 whereupon adaptor plate 51 may be actuated to engage the chain. It will be understood that when the piston rod 50 is actuated to an extended position, the chain 44 will move the member 42 and plate 41 into engagement with the edge of the plate 13 forcing it against the square edge 40. Obviously such squaring operation takes place while the hold-down plates 39 are in a retracted position and after the plate 13 has been moved to its desired cutting position. A pair of three-way valves 61 and 62 respectively, control application and release of air pressure to the flexible application hoselines 63 and 64 and release lines 65 and 66 leading to the hold-down and squaring cylinders D and 47.

The mechanism described above for squaring plate materials is equally adaptable to side clamping of single or multiple units of bar stock for cutting to desired lengths.

From the above description it will be understood that a typical setup and sawing operation for a metal plate will consist in the steps of manually sliding the hold-down cylinders D1, D2 and D3 to any desired position if a change in position is necessary, placing a plate 16 on the table surface in desired cutting position, moving the squaring member 42 to a position approaching the edge of the plate 16, actuating the adaptor plate 51 to engage the chain 44, moving the valve 62 to application position for squaring the plate 16, moving the valve 61 to application position for simultaneously actuating hold-down cylinders D1, D2 and D3, and then advancing saw B through actuation of the crank arm 29 to effect the final sawing operation. Where light gauge sheet material is involved the power squaring operation may be omitted and replaced by manual squaring of the material against the angle 40.

When the cut is completed and the saw retracted, the cut plate may be quickly released by simply moving the valves 61 and 62 to their release positions whereupon the plate may be advanced to a new cutting position and securely clamped again by moving the valves 62 and 61 to their apply positions. Such sequence of operations may be effected very rapidly as compared with any conventional manual clamping means and due to the secure clamping of the material at successive points along the line of cut a more rapid speed of the saw and smoother cut may be effected than in a case of conventional clamping means.

In addition, due to the secure clamping of the material along the line of cut a relatively narrow saw table may be employed in cutting large plates which substantially overhang the table edge thereby conserving floor space and table construction materials.

The independent action of the hold-down cylinders also makes it possible to clamp materials of non-uniform thickness, irregular stacks of plate or sheet materials, or other materials having stepped or irregular upper surfaces. Thus the present combination of horizontal and vertical clamping devices gives a complete versatility in rapidly clamping many forms of metal materials for sawing operations heretofore unavailable in any equipment known to be in commercial use.

While a preferred embodiment has been shown and described in detail, it will be understood that numerous modifications might be resorted to without departing from the scope of my invention as defined in the following claim.

I claim:

A table for a power saw comprising a table structure having means defining an unobstructed horizontal work-supporting surface traversed by an open slot, a first traversely extending horizontal beam above said table on one side of said slot and parallel to said slot for supporting a saw assembly movable transversely of said table with a saw blade enterable in said slot, a second transversely extending horizontal beam on the other side of said slot and parallel thereto, support means elevating said second beam above said table with that portion of the second beam overlying the table being unobstructed, a plurality of transversely spaced fluid pressure actuated cylinders slidably supported by and depending from said second beam, a source of fluid pressure for actuating said cylinders, flexible conduits connecting said cylinders to said source while accommodating transverse adjustment of said cylinders along said second beam, and pressure pads carried by said cylinders for engaging a workpiece on said table in closely spaced parallel relation to said slot, vertical extension of said cylinders thrusting the pads against said workpiece with the thrust reaction being exerted against said reaction member to bind said cylinders in a transversely adjusted position to secure said workpiece in position over said slot for cutting by said saw.

References Cited in the file of this patent

UNITED STATES PATENTS

| | | |
|---|---|---|
| 1,934,207 | Pennock | Nov. 7, 1933 |
| 1,976,020 | Hilke | Oct. 9, 1934 |
| 2,269,328 | Williamson | Jan. 6, 1942 |
| 2,517,431 | Hildebrand et al. | Aug. 1, 1950 |
| 2,623,560 | Joseph | Dec. 30, 1952 |
| 2,623,590 | Johnson et al. | Dec. 30, 1952 |